INVENTOR.
ALAN J. ADLER

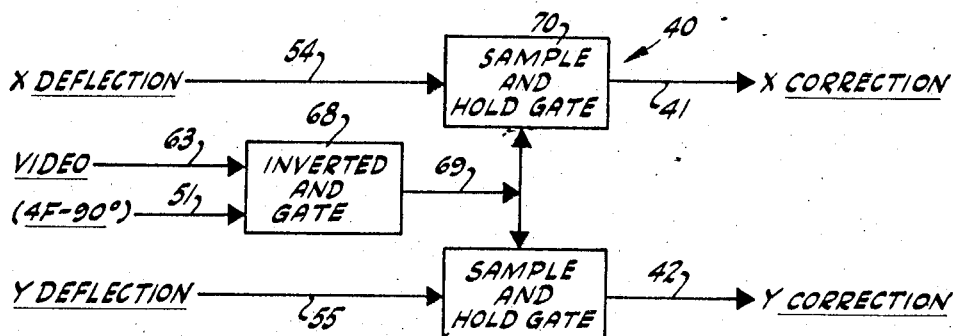
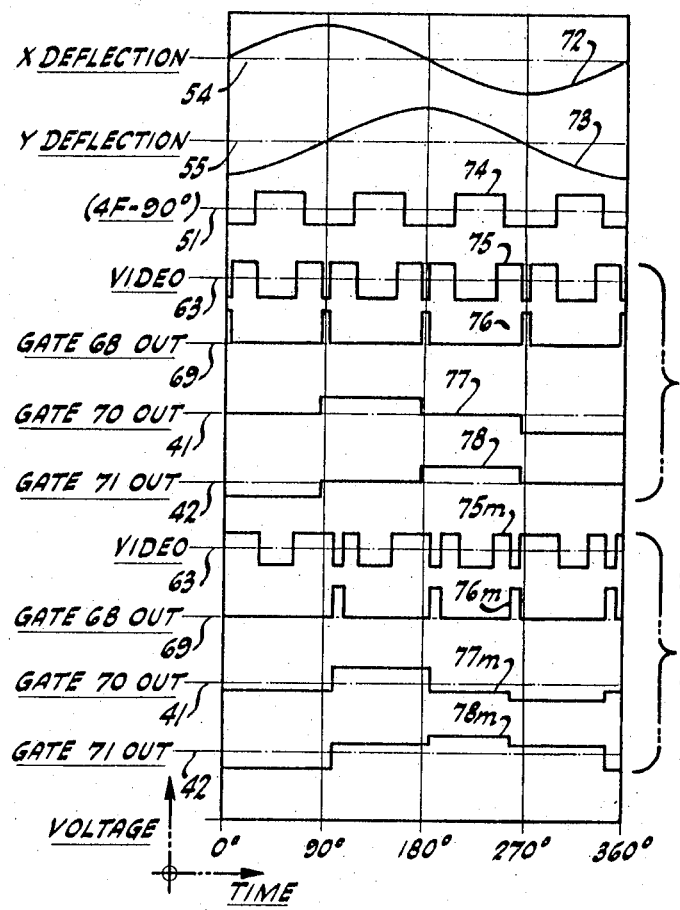
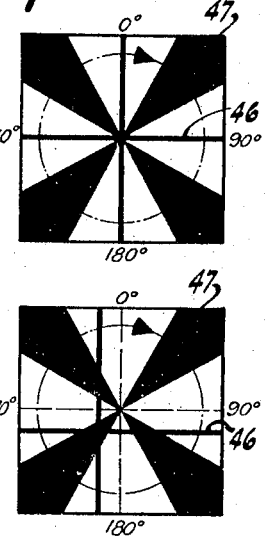
FIG-2
FIG-3
FIG-3A
FIG-3B
INVENTOR.
ALAN J. ADLER
BY Stanley Bialos,
Homer O. Blair, &
Robert L. Nathans
ATTORNEYS Feb. 24, 1970 A. J. ADLER 3,497,705
MASK ALIGNMENT SYSTEM USING RADIAL PATTERNS
AND FLYING SPOT SCANNING
Filed Feb. 12, 1968 7 Sheets-Sheet 3
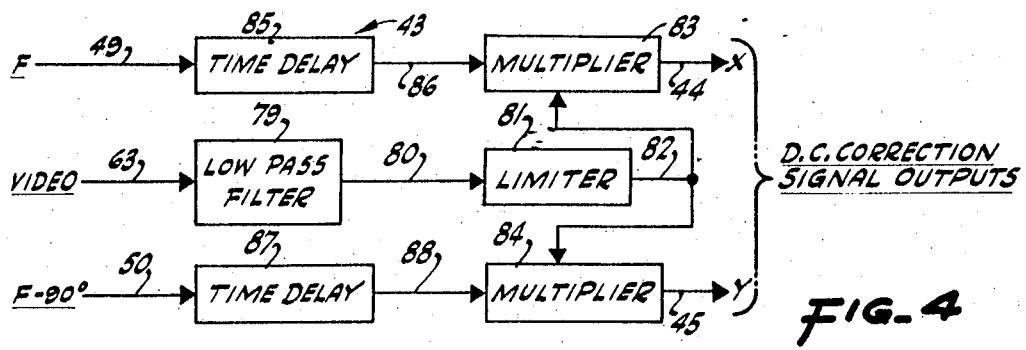
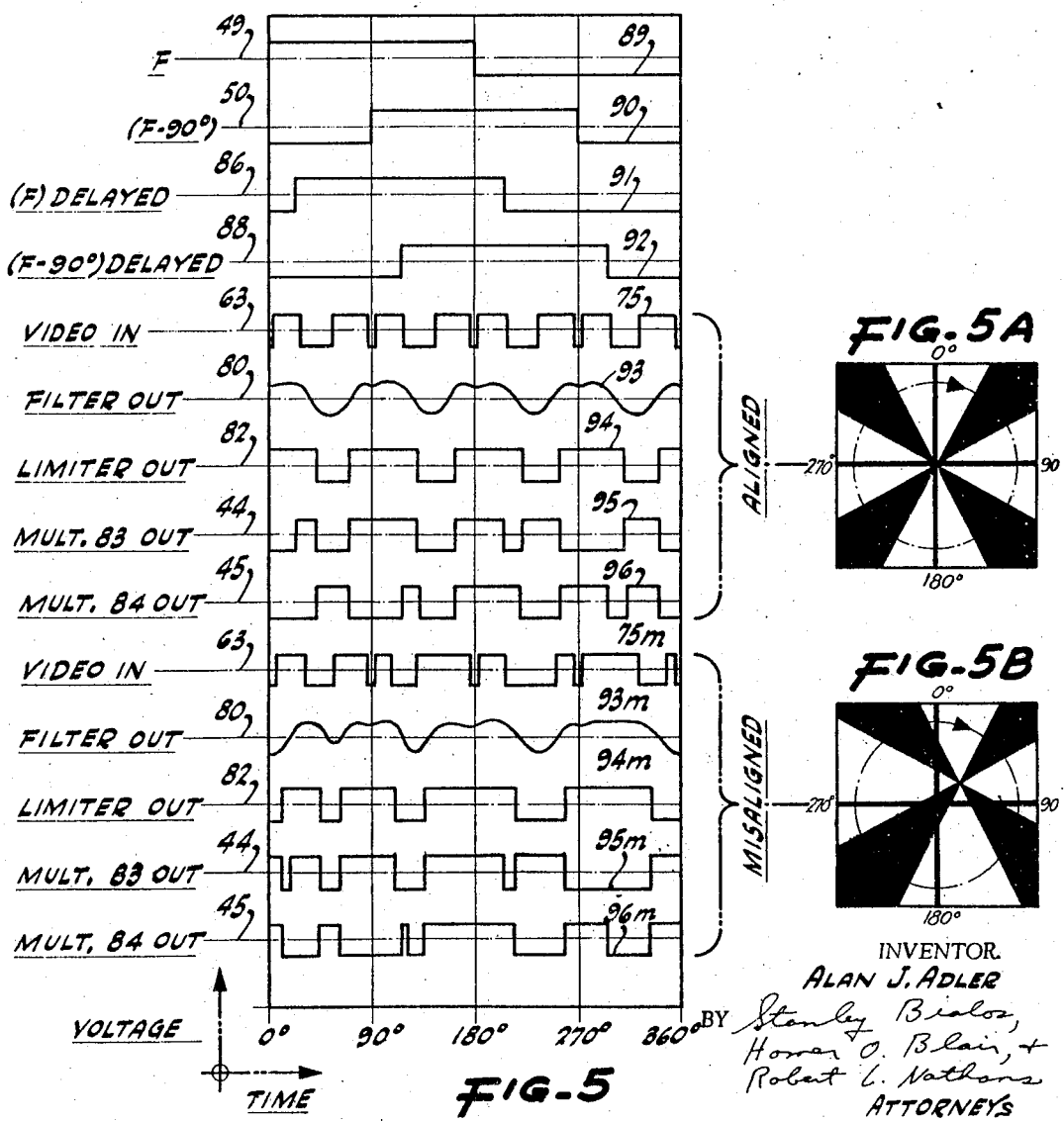
INVENTOR.
ALAN J. ADLER

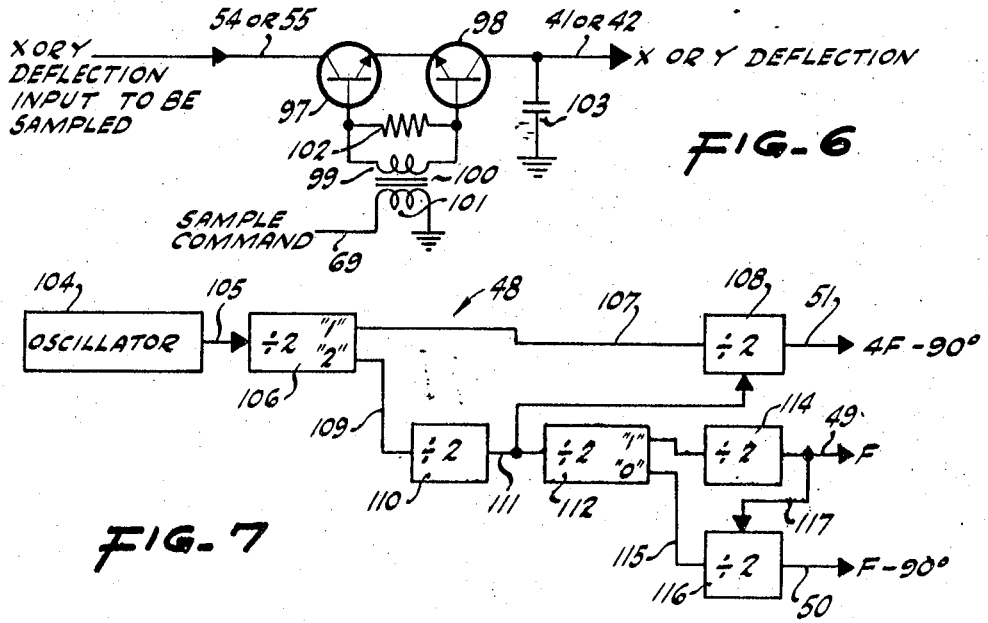
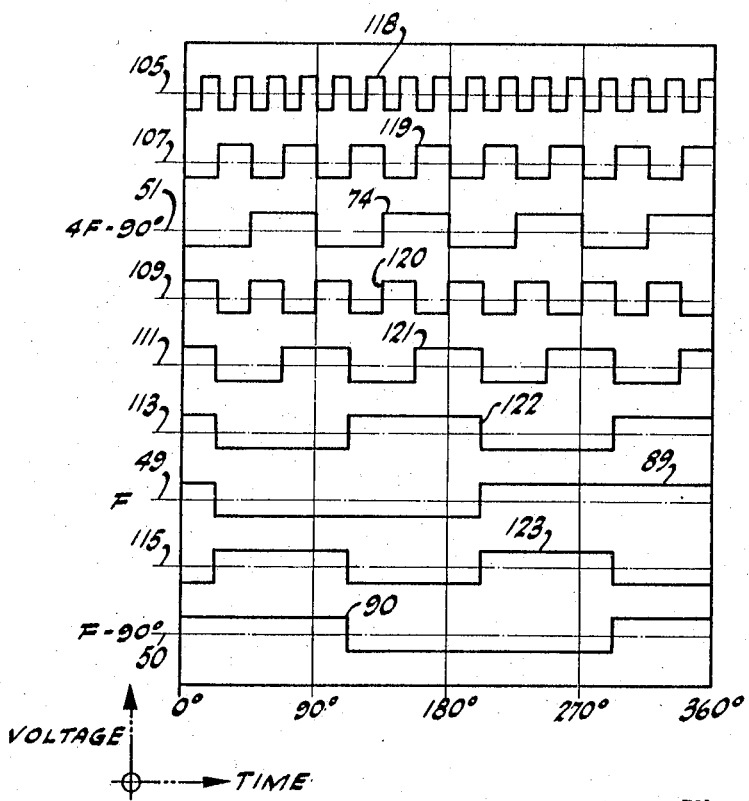

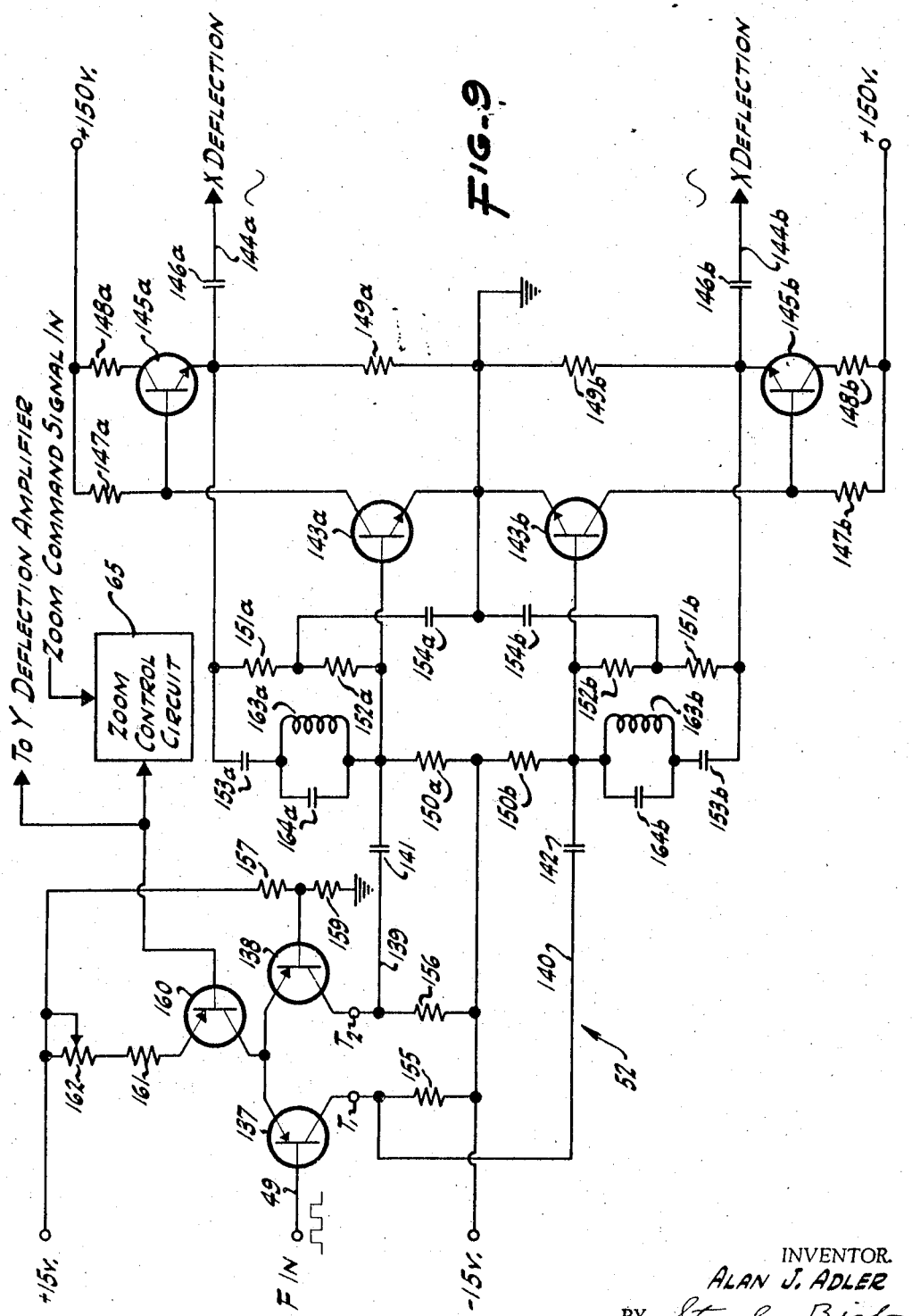

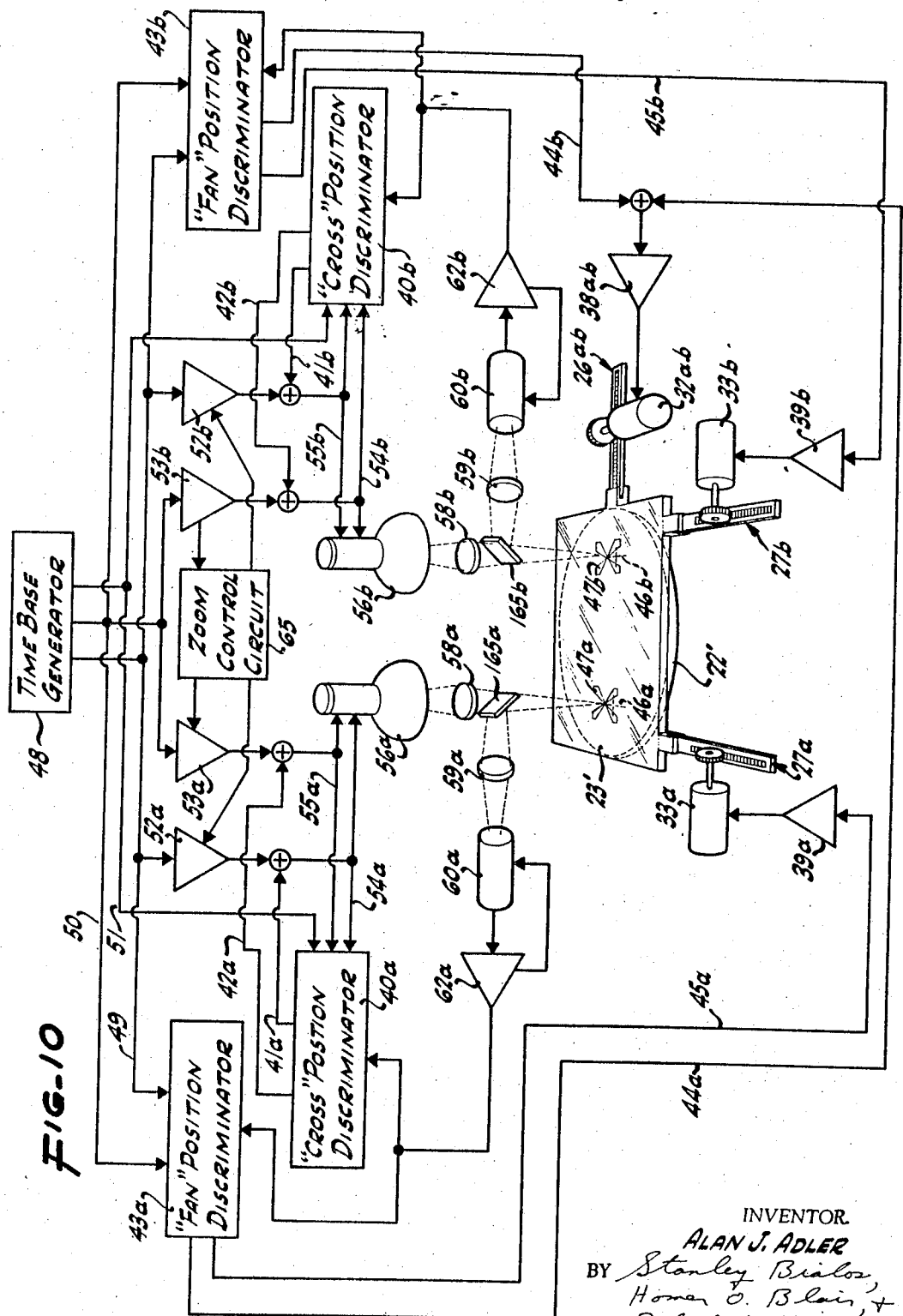

United States Patent Office 3,497,705
Patented Feb. 24, 1970

3,497,705
MASK ALIGNMENT SYSTEM USING RADIAL PATTERNS AND FLYING SPOT SCANNING
Alan J. Adler, Palo Alto, Calif., assignor to Itek Corporation, Lexington, Mass., a corporation of Delaware
Filed Feb. 12, 1968, Ser. No. 704,647
Int. Cl. H01j 39/12, 3/14, 5/16
U.S. Cl. 250—237                                26 Claims

ABSTRACT OF THE DISCLOSURE

Method of and apparatus for effecting a condition of alignment between a pair of components respectively provided with alignment patterns each of which has a plurality of equally-spaced radials projecting outwardly from a common origin. The radials of the two patterns are dissimilar so that they can be distinguished one from the other; and the component carrying one pattern may be a transparent alignment mask and the component provided with the other pattern may be a transparent or an opaque work object such as an integrated circuit, transistor, or other semiconductor. The patterns can be inspected simultaneously by the beam from a flying spot scanner, and video signals derived from a multiplier phototube upon the photocathode of which the modulated light from such scanner is imaged are delivered to a pair of discriminator units respectively associated with the two components and operatively responsive to such signals to detect any misalignment of the patterns and components associated therewith and to effect relative displacements thereof as necessary to properly align the same.

Characterization of the invention

The invention is characterized in one aspect thereof by means for supporting a pair of components respectively provided with alignment patterns distinguishable one from the other and each bearing a predetermined relation with the component provided therewith, by a scanning system for inspecting the alignment patterns to determine the relative positions thereof and for producing output signals from which the relative positions of the alignment patterns can be ascertained, by a pair of position discriminator units operative to derive from the output signals correction signals indicative of any pattern misalignment, by a time-base generator providing timing signals and reference signals for the scanning system and discriminator units, and by alignment error correction means for effecting relative displacements of the alignment patterns and components providing the same in response to the correction signals to effect such condition of alignment of the components. In another aspect, the invention is characterized by one of the components being a transparent alignment mask adapted to be located in superposed juxtaposition with the other component, by each of the alignment patterns having a plurality of radials projecting outwardly from a comon origin in angularly spaced relation, and by the radials of one pattern being distinguishable from the radials of the other to enable differentiation therebetween.

Disclosure

This invention relates to a method of and apparatus for effecting a condition of positional alignment between a pair of components provided with alignment patterns for use in establishing such condition of alignment; and the invention is further concerned with the patricular alignment patterns respectively carried by such components. The invention has utility in various environments as, for example, in the semi-conductor industry for construction of integrated circuits wherein the various layers or strata comprising the same are built up in successive operations that require precise positioning of the circuit wafer for each successive operation performed thereon.

Considering the semiconductor in somewhat greater detail as respects the present invention, in the manufacture of transistors and integrated circuits, photographic contact printing procedures are used extensively and the requirements thereof are of considerable significance. More particularly, in the fabrication of an integrated circuit, thin silicon wafers are coated with a suitable photoresist material and are exposed by contact printing techniques in order to prepare certain areas of the wafer for selective etching and diffusion. Typically five contact prints are required for the circuit fabrication of each wafer although the precise number of prints may be as low as three for simple circuit devices and may exceed seven in number for more complex semiconductors. Following the first contact printing and diffusion operation, all subsequent prints must be accurately aligned with imagery then present on the silicon wafer, and the accuracy of the requisite alignment in most cases is about ±3 microns although the accuray range may often vary from ±1 micron to ±10 microns.

At present propert alignment of the wafers for each successive operation is a manual procedure performed with the aid of high-powered microscopes, and each alignment step usually requires from about one-half to three minutes to complete which is quite long relative to the exposure time of about ten seconds usually required for the contact printing when using a collimated 200-watt mercury vapor lamp. Because of the extreme precision required to effect the requisite alignment, the operators cannot work steadily and require considerable periods of rest, wherefore the rate of production of each operator is relatively low. Further, operator fatigue increases the incidence of misalignment thereby causing the wafer to be discharded which is costly particularly if the misalignment occurs toward the end of the successive alignment steps, e.g., the last printing and diffusion step. Further aggravating the difficulties incident to manual alignment procedures is the rapid movement in the semiconductor industry toward smaller, higher frequency circuit devices that make alignment of the wafers even more exacting and difficult of achievement.

In view of the foregoing, an object, among others, of the present invention is to provide a method of and apparatus for effecting a condition of alignment between a pair of components respectively provided with alignment patterns and which components may, in the case of semiconductors, be a silicon wafer provided therealong with an alignment pattern and a mask also provided with an alignment pattern cooperative with the other such alignment pattern in effecting the requisite condition of alignment between the mask and wafer. Immediate benefits from the invention in its application to the semiconductor industry include a sharp reduction in the rejection rates of circuit wafers, the ability to make smaller devices capable of operating at higher frequencies, the saving of materials by producing more individual semiconductor devices on a single wafer, generally higher production rates because of a reduction in the time required to effect alignment at each step in the manufacturing process, and the great savings in labor costs.

In the practice of the invention the two components which are to be aligned with each other (e.g., a silicon wafer and a contact printing mask) are located with respect to each other in superposed juxtaposition and in a condition approximating coarse alignment. In the usual instance one of the components, such as the mask, is transparent and the alignment patterns respectively carried by the two components are scanned simultaneously by flying spot scanner apparatus. The pattern-modulated light from the scanner apparatus is imaged onto photosensitive apparatus, such as a multiplier phototube structure, and the video signals generated by the photosensitive apparatus in response to the modulated light impinging thereon are delivered to position discriminators respectively associated with the two components and provided with means for segregating from the video signals the components thereof respectively relating to the two alignment patterns, and with means for generating in response thereto any correction signals that may be necessary to move the patterns relative to each other until the requisite condition of alignment therebetween is effected. The system has a relatively large aquisition range and reduces its range or area of inspection automatically as the two patterns are moved toward alignment so as to provide detailed inspection of smaller and smaller areas to assume a high degree of accuracy in the final alignment result.

Embodiments of the invention are illustrated in the accompanying drawings in which:

FIGURE 2 is a block diagram illustrating the components comprising the position discriminator associated with the alignment pattern defined by the narrow cross;

FIGURE 3 is a chart comprising a plurality of wave forms appearing at various locations in the alignment system and with special reference to the position discriminator illustrated in FIGURE 2;

FIGURES 3a and 3b are diagrammatic views illustrating the alignment patterns in superposed relation with FIGURE 3a depicting the patterns in a condition of alignment and FIGURE 3b depicting such patterns in a misaligned condition;

FIGURE 4 is a block diagram illustrating the components comprising the position discriminator associated with the alignment patterns defined by the fan-shaped cross (having somewhat the appearance of a formee cross);

FIGURE 5 is a chart comprising a plurality of wave forms appearing at various locations in the alignment system and with special reference to the position discriminator illustrated in FIGURE 4;

FIGURES 5a and 5b are diagrammatic views illustrating alignment patterns in superposed relation with FIGURE 5a depicting the patterns in a condition of alignment and FIGURE 5b depicting such patterns in a misaligned condition;

FIGURE 6 is a schematic circuit diagram of the sample-and-hold-gate depicted in FIGURE 2;

FIGURE 7 is a block diagram of the time-base generator;

FIGURE 8 is a chart comprising a plurality of wave forms appearing at various locations in the time-base generator;

FIGURE 9 is a schematic circuit diagram of the deflection amplifiers;

FIGURE 10 is a diagrammatic view of a modified alignment system which can be used with an opaque component such as a semiconductor and transparent alignment masks comprising the other component.

Figure 1:
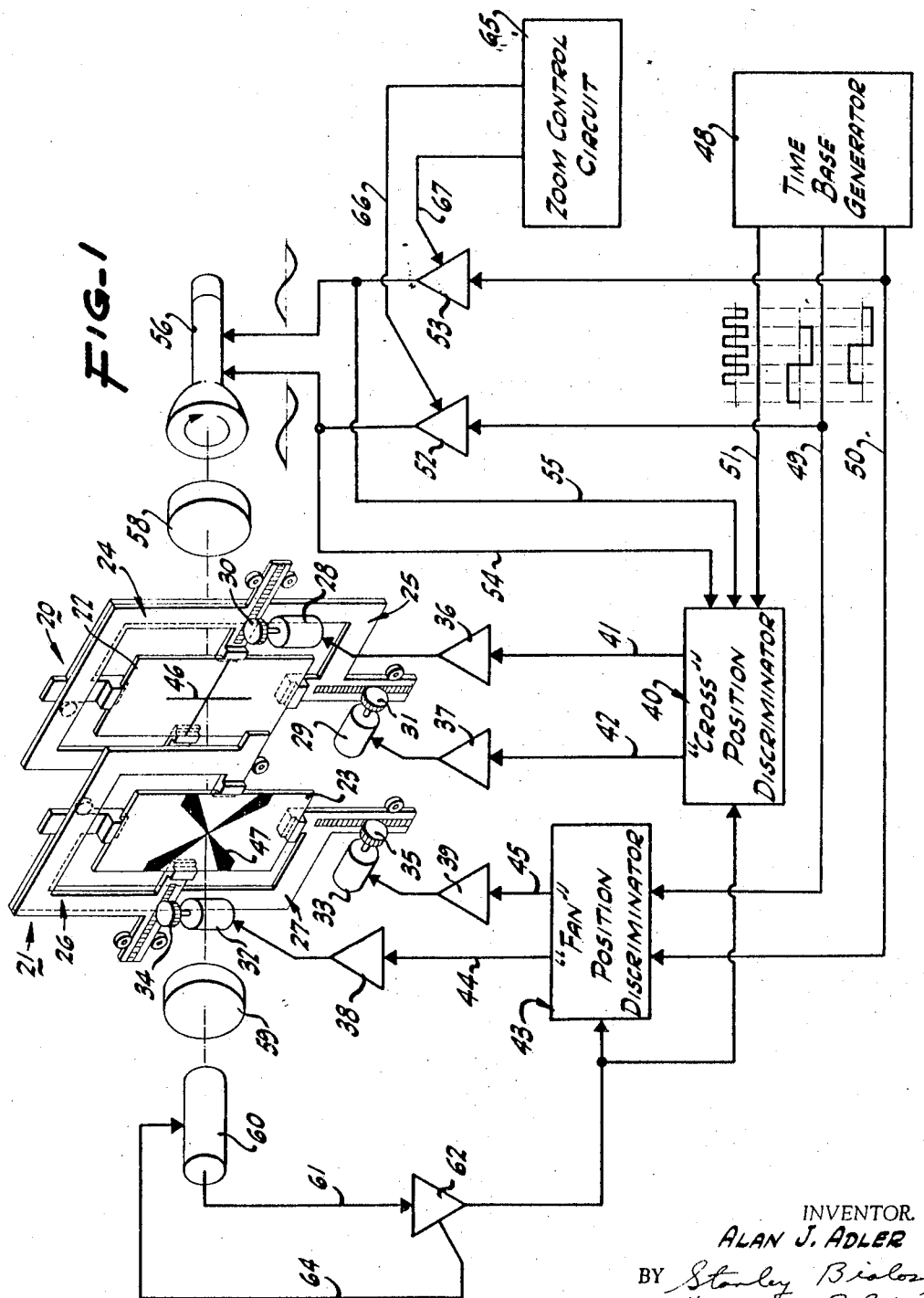
FIGURE 1 is a diagrammatic view illustrating an overall alignment system embodying the invention.

Although the introductory comments have been directed largely to fabrication procedures concerned with the manufacture of semiconductors insofar as such procedures pertain to the present invention, the invention is not restricted to use thereof in the semiconductor industry, and the embodiment of the invention illustrated in FIGURE 1 considers the more general case in which the pattern-equipped components to be aligned with each other are both transparent, wherefore such embodiment does not include the somewhat more specialized apparatus required whenever at least one such component is non-transparent, as in the case of a silicon wafer upon which an integrated circuit or other semiconductor is built, or the further specialization necessitated when rotational errors are corrected as well as those along the normally-oriented axes. Accordingly, the alignment system illustrated in FIGURE 1 lends itself to a more direct description of the invention and will now be considered.

Such embodiment of the alignment system includes a pair of support structures 20 and 21 respectively adapted to receive or hold a pair of components 22 and 23 which must be aligned with each other in a predetermined positional relationship. In this particular system, the support structures 20 and 21 are each movable but relative movement therebetween is the feature of importance (the consideration of relative movement also involves the beam of the flying spot scanner and will be treated in further detail hereinafter) so that one of the supports could be stationary and the other support movable with respect thereto. However, providing movement for each of the supports has the advantage of increasing the rate at which alignment of the two components 22 and 23 can be effected and also of reducing the extent of permissible movement that otherwise would be required for one of the supports if it were the only support movable. The support structures may take a variety of forms and the components 22 and 23 may be secured thereto in any number of ways.

As will become more apparent hereinafter, each of the support structures is movable in opposite directions along axes that are normally disposed and which axes for purposes of description convenience can be taken to be the $x$ and $y$ axes of a Cartesian coordinate system. In this reference, the support 20 in the particular system being considered has a pair of support elements 24 and 25 which are respectively movable in directions parallel to such $x$ and $y$ axes. The support 21 is similarly provided with support elements 26 and 27 respectively movable in directions parallel to the $x$ and $y$ axes. Since the support elements of each of the supports 20 and 21 must move relative to each other, accommodation is necessarily provided for such movements thereon along the $x$ and $y$ axes, and for a specific example of a structural composition which can be employed, reference may be made to Hobrough and Wood Patent No. 3,330,964, which issued in the United States on July 11, 1967.

However, an illustrative structure is shown in FIGURE 1, and in such structure, each of the four support elements is somewhat C-shaped (reversed in orientation in the case of the element 25 and opening downwardly in the case of the elements 24 and 26) in configuraton so that each support has a large central opening in which the associated transparent component is supported. Respectively connected with the elements 24 and 25 of the support 20 so as to move such elements along the associated axes thereof are motors 28 and 29. These motors are respectively provided with drive gears 30 and 31 operatively connected through rack gears with the support elements 24 and 25 so as to reciprocably displace the same along such $x$ and $y$ axes. Correspondingly, a pair of motor 32 and 33 are respectively connected with the support elements 26 and 27 of the support 21, and such motors are respectively equipped with drive gears 34 and 35 operatively connected through rack gears with the support elements so as to reciprocate the same along their respectively associated axes.

Evidently, the various motors must be supported so as to accommodate the requisite relative movements of the support elements associated therewith, and the structural composition disclosed in the aforementioned Patent No. 3,330,964 includes such mounting arrangement. Simply stated, in the supports shown, and considering the support 20, the element 24 carries the element 25 with it as it is displaced along the $x$ axis so that the motor 20 may be supported by the element 24. The motor 28 will be mounted independently of the two elements. The same arrangement is provided for the support 21.

The motors 28, 29, 32 and 33 are servo motors responsive to the outputs of a plurality of servo amplifiers respectively connected therewith. For purposes of identification, the servo amplifiers respectively controlling the motors 28, 29, 32 and 33 are denoted with numerals 36, 37, 38 and 39. These amplifiers are responsive to correction signals delivered thereto from respectively associated position discriminators, and in this respect the amplifiers 36 and 37 receive correction signals from a position discriminator 40 via signal lines 41 and 42, and the amplifiers 38 and 39 receive correction signals from a position discriminator 43 via signal lines 44 and 45. It is evident from FIGURE 1 that the discriminator 40, amplifiers 36 and 37 and motors 28 and 29 are associated with the support structure 20 and component 22 carried thereby, and that the position discriminator 43, amplifiers 38 and 39 and motors 32 and 33 are associated with the support structure 21 and the component 23 which it carries.

In the particular system being considered, the component 22 is provided thereon with an alignment pattern 46 in the form of intersecting lines disposed at right angles with respect to each other. Such pattern 46 is generally in the form of a Greek cross in which the upright bar and transverse beam (i.e., the various arms or radials) are relatively narrow. Correspondingly, the component 23 is provided thereon with an alignment pattern 47 also in the form of intersecting lines disposed at right angles with respect to each other. Such pattern 47 is generally in the form of a formee cross in which the upright bar and transverse beam (i.e., the various arms or radials) are narrow at their origin and progressively increase in angular width toward the outer termini thereof. Thus, each of the alignment patterns is a radial pattern, and for convenience the pattern 46 may sometimes be referred to herein as the "cross" pattern and the pattern 47 as the "fan pattern."

Each of the position discriminators 40 and 43 receives as inputs thereto certain reference signals and a video signal derived from the relative position at any time of the alignment patterns 46 and 47. The reference signals are derived from a time-base generator 48 operative to develop three separate square wave output signals respectively appearing on signal lines 49, 50 and 51. The signal appearing on the line 49 is a square wave that cyclically alternates between positive and negative values which are essentially symmetrical. The signal appearing on the line 50 is substantially identical to the signal appearing on the line 49 but is in phase quadrature therewith and lags the same by about 90°. The signal appearing on the line 51 is also a square wave and corresponds to the signal appearing on the line 50 except that it is essentially the fourth harmonic thereof and has a frequency about four times that of the signal on the line 50. For purposes of convenience in referring to the various output signals from the time-base generator 48, the signal appearing on the line 49 is denoted "F," the signal on the line 40 is denoted "F—90°," and the signal appearing on the line 51 is denoted "4F—90°."

The "F" and "F—90°" output signals appearing on the lines 49 and 50 are transmitted directly thereby to the discriminator 43 and define the reference signal input thereto. These same signals are transmitted to and constitute the respective inputs of a pair of tuned deflection amplifiers 52 and 53 which convert such square waves into sine waves transmitted via signal lines 54 and 55 to the discriminator 40 to define the two reference signal inputs thereto. The discriminator 40 also has a control or selection signal input constituting the "4F—90°" signal transmitted directly thereto via the signal line 51. Thus, the reference signal inputs to the discriminator 43 are square waves of the same frequency but out of phase by 90°, and the reference signal inputs to the discriminator 40 are sine waves respectively constituting integrated reproductions of the square waves appearing on the signal lines 49 and 50. Additionally, the "4F—90°" square wave signal appearing on the line 51 is delivered to the discriminator 40 and is used thereby for sampling control or selection, as will be described in detail hereinafter.

The sine wave signals appearing on the lines 54 and 55 are also delivered to the deflection plates of a cathode ray tube defining a flying spot scanner 56 and constitute the deflection signals therefor. Since such sine wave signals are in phase quadrature, the path traversed by the flying spot or scanning beam of the scanner 56 describes a conventional circular Lissajous pattern as denoted at 57 on the face of the scanner tube. The light or scanning beam emanating from the flying spot scanner 56 is focused by an objective lens 58 onto the alignment patterns 46 and 47 of the components 22 and 23 which components are disposed in substantially contiguous juxtaposition thereby obviating any significant depth or thickness dimension of the plane onto which the scanning beam is focused by the lens 58, which thickness would reduce the sharpness of focus. In the case of the components 22 and 23 being considered herein, each is transparent and, accordingly, the scanning beam passes therethrough, and the pattern-modulated beam is imaged by a collector lens 59 onto the face of a photoelectric sensor 60 which may be a multiplier phototube.

The video output signals developed by the photoelectric sensor 60 in response to the light imaged onto the face thereof are transmitted by a signal line 61 to a video amplifier 62, and the amplified replicas of the video signals are transmitted through a signal line 63 to the discriminators 40 and 43 and constitute the video input signals thereto. An automatic gain control loop is included in association with the sensor 60 and video amplifier 62 as indicated by the line 64. Also included in the system is a zoom control circuit 65 which is connected to the deflection amplifiers 52 and 53 by signal lines 66 and 67. The zoom control circuit 65 is operative to reduce the size or area of the circular scanning pattern traversed by the spot of the scanner 56 so as to increase the accuracy of the alignment operation by examining in greater detail progressively smaller areas of the alignment patterns 46 and 47. Such reduction in size may be continuous or in discrete steps depending upon the particular characteristics of the zoom control circuit.

Considering in general the operation of the system illustrated in FIGURE 1, the time-base generator 48 is operative to produce the three square wave voltage signals appearing on, and shown in association with, the signal lines 49, 50 and 51. The two signals appearing on the lines 49 and 50 are out of phase by about 90°, and such signals are respectively amplified in the deflection amplifiers 52 and 53 which develop sine waves therefrom that are transmitted to the flying spot scanner 56 to generate the circular scan indicated at 57 on the face thereof. The scanning light emanating from the scanner 56 is focused by the objective lens 58 onto the alignment patterns 46 and 47, and the light transmitted through the components 22 and 23 is directed by a collector lens 59 onto the face of the photoelectric sensor 60. The resultant video signals developed by the sensor 60 are transmitted after amplification thereof in the video amplifier 62 to the discriminators 40 and 43.

The discriminators utilize the various signals originated at the time-base generator 48 and the video signals transmitted over the signal line 63 to produce correction signals indicative of any misalignment as between the patterns 46 and 47. Such correction signals, after amplification in the servo amplifiers 36, 37, 38 and 39, energize the appropriate servo motors 28, 29, 32 and 33 as may be necessary to shift the support structures 20 and 21 to displace the components 22 and 23 relative to each other toward a condition of alignment. Such alignment operation continues in response to the presence of any misalignment as sensed by the scanning system, and as the components 22 and 23 are moved toward a condition of alignment, the zoom control circuit 65 is operative to decrease the amplification occurring in the amplifiers 52 and 53 so that progressively smaller areas of the patterns 46 and 47 are scanned about the origins thereof to refine the operation and thereby increase the accuracy of the alignment achieved.

Considering the operation of the position discriminators in greater detail, the discriminator 40 is illustrated in block diagram form in FIGURE 2 and is shown there to include an inverted-and-gate 68 which receives as inputs thereto the video signal appearing on the line 63 and the "4F—90°" control signal appearing on the line 51. The output signals from the inverted-and-gate 68 are transmitted by a signal line 69 to a pair of sample-and-hold-gates 70 and 71. Each of the gates 70 and 71 has an additional signal input thereto and in the case of the gate 70, such signal is the x-deflection or reference signal appearing on the signal line 54. In the case of the gate 71, such additional signal is the y-deflection or reference signal appearing on the signal line 55. The output signal from the gate 70 is delivered to the signal line 41 for transmission thereby to the aforementioned servo amplifier 36, and correspondingly, the output signal of the gate 71 is delivered to the signal line 42 for transmission thereby to the aforementioned servo amplifier 37.

The function of the discriminator 40 and component parts thereof is most readily explained with reference to the wave forms of the signals appearing at various points in the discriminator, and such wave forms are illustrated in FIGURE 3 to which reference will now be made. As a matter of convenience in identification, the x axes of the wave forms in FIGURE 3 are labeled with the numerals used to designate the signal lines on which such wave forms appear, and each of these axes in FIGURE 5 is a zero voltage line to which the wave forms are referenced. The uppermost wave form 72 is sinusoidal and constitutes the x-deflection signal appearing on the line 54. The next wave form is denoted 73 and it is also sinusoidal and constitutes the y-deflection signal appearing on the line 55. Another input to the discriminator 40 is the wave form 74 which is a square wave and constitutes the "4F—90°" signal appearing on the line 51. The video signal transmitted along the line 63 constitutes the remaining input signal to the discriminator 40, and such video signal when the two patterns 46 and 47 are accurately aligned, as illustrated in FIGURE 3a, is denoted with the numeral 75 and is seen to constitute a square wave pattern.

The signal appearing on the output signal line 69 from the inverted-and-gate 68 is represented by the wave form 76 and corresponds to the video wave form having the characteristics of the wave form 75 resulting from a condition of perfect alignment of the patterns 46 and 47. Whenever the output signal on the line 69 has the characteristics of the wave form 76, the signal outputs on the lines 41 and 42 from the sample-and-hold-gates 70 and 71 are accurately depicted by the wave forms 77 and 78; and it may be noted that each of the wave forms 77 and 78 is a square wave having equal positive and negative portions so that the DC voltages on the lines 41 and 42 averaged over one or more complete cycles are essentially zero in each instance.

To complete the identification of the wave forms illustrated in FIGURE 3, the four lowermost wave forms represent a condition in which the patterns 46 and 47 are misaligned, such as the condition of misalignment illustrated in FIGURE 3b. These four wave forms respectively constitute the video signal appearing on the line 63, the output signal of the inverted-and-gate appearing on the line 69, the output signal of the sample-and-hold-gate 70 appearing on the line 41, and the output signal of the sample-and-hold-gate 71 appearing on the line 42. For purposes of identification, the signal wave forms representing misalignment of the patterns 46 and 47 are respectively denoted 75m, 76m, 77m and 78m. As respects the signal depicted by the wave form 77m, it has an average negative DC value over any complete cycle, and the signal depicted by the wave form 78m has an average positive DC value over such cycle.

The x and y deflection wave forms 72 and 73 are in phase quadrature such that the wave form 73 lags the wave form 72 by 90°; and these wave forms provide the reference signals utilized by the sample-and-hold-gates 70 and 71 to provide the time reference for the x and y channels of the discriminator 40. The inverted-and-gate 68 of the discriminator 40 compares the video signal delivered thereto on the line 63 and the "4F—90°" signal delivered thereto on the line 51 and permits selected portions of the video signal to pass therethrough onto the signal line 69 for delivery to the sample-and-hold-gates 70 and 71. Thus, the "4F—90°" signal is used by the inverted-and-gate 68 to make such gate effective at certain periodic intervals to pass portions of the video signal therethrough and at other intervals to prevent passage of the video signal, wherefore such "4F—90°" signal has the effect of blanking out certain portions of the scanning cycle as concerns operation of the position discriminator 40.

More particularly, the inverted-and-gate 68 is operative to pass video signals therethrough only during those periods that the "4F—90°" blanking signal is negative; and such blanking signal as it appears on the line 51 is a square wave having negative components respectively spanning those portions of the scanning cycle at which the radials of the alignment pattern 46 are most likely to appear, namely, at the 0°, 90°, 180° and 270° positions. Consequently, since there can be no output signal from the gate 68 appearing on the signal line 69 unless the "4F—90°" signal is negative, the discriminator 40 effectively samples or is operative to inspect the video signal for timing errors only during the time intervals at which the various radials of the alignment pattern 46 should appear.

Referring to the wave form 76 of the output signal appearing on the line 69, it will be observed that such signal is positive whenever the "4F—90°" signal is negative concurrently with the video signal being negative. For all other signal combinations (i.e., the "4—90°" and video signals being either both positive or of opposite polarity) the output signal appearing on the line 69 is zero. Therefore, whenever the video signal 75 appearing on the line 63 is the result of a condition of proper alignment between the patterns 46 and 47, as shown in FIGURE 3a, the output signal from the inverted-and-gate 68 constitutes a succession of positive pulses timed to coincide with the 0°, 90°, 180°, and 270° positions of the scanning spot. These positive pulses are delivered to the sample-and-hold-gates 70 and 71 each of which functions as a switch that is closed whenever the output signal from the gate 68 is positive and is open whenever the output signal from such gate is negative.

Considering the wave form 77 constituting the signal output from the sample-and-hold-gate 70, whenever the video signal represents a condition of proper alignment of the two patterns 46 and 47 the wave form 77 suddenly jumps to a positive value at about the 90° position whereat the x-deflection wave form 72 and the output signal 76 from the inverted-and-gate 68 are both positive, and the wave form then maintains such positive value until the 180° position is reached at which the sinusoidal wave form 72 has a zero value. At this time the wave form 77 suddenly returns to a zero value which is then maintained until the 270° position is reached at which time position the deflection wave form 72 is negative and the video wave form 76 is positive. As a consequence of this occurrence, the wave form 77 suddenly jumps to a negative value and then maintains such value until the 360° or 0° position of the scanning spot is reached with the result that the deflection wave form 72 has a zero value causing the wave form 77 to become zero as it would at the 180° position.

Evidently then, the wave form of the output signal from the sample-and-hold-gate 70 has substantially equal positive and negative portions so that averaged over one or more complete scanning cycles, the DC voltage of the signal appearing on the line 41 is substantially zero.

The wave form 78 is appearing on the line 42 is similar to the wave form 77 but is displaced therefrom and lags the same by 90°. Accordingly the DC voltage appearing on the signal line 42 averaged over one or more complete scanning cycles is substantially zero. Since the average values of the DC voltages delivered by the signal lines 41 and 42 to the servo amplifiers 36 and 37 are zero, in each instance, whenever the video signal 75 represents a condition in which the patterns 46 and 47 are properly aligned, the servo motors 28 and 29 are not energized by such zero-value voltages and corrective displacement of the component 22 neither occurs nor is necessary.

Corrective displacements are effected, however, whenever the average value of the DC voltage appearing on one or the other or both of the signal lines 41 and 42 is a value other than zero, corresponding to the patterns 46 and 47 being misaligned. Consider for example a condition of misalignment such as illustrated in FIGURE 3b in which the patterns 46 and 47 are out of alignment in both the x and y directions. Assuming a Cartesian coordinate system in which the center of the fan pattern 47 is essentially coincident with the origin of the x and y axes of such system, as shown in FIGURE 3b, the cross pattern 46 is evidently offset in the $-x$, $-y$ direction such that the center of the pattern 46 lies in the third quadrant of the coordinate system. The wave form of the video signal appearing on the line 63 for such condition of misalignment is shown in FIGURE 3 as the wave form 75m, and the corresponding output signal from the inverted-and-gate 68 appearing on the signal line 69 has the characteristics illustrated by the wave form 76m. Also correspondingly, the output signals of the sample-and-hold-gates 70 and 71 respectively appearing on the lines 41 and 42 have the configurations shown at 77m and 78m in FIGURE 3. It will be apparent from observation that the average DC value of the signal wave form 77m appearing on the line 41 is negative, and that the average DC value of the signal wave form appearing on the line 42 is positive.

Since the pattern 46 is misaligned, the video signal appearing on the line 63 will not be symmetrical because the radials of the pattern 46 are displaced from their proper 0°, 90°, 180° and 270° positions, wherefore the scanning spot does not encounter and traverse the radials at such scanning positions. Consequently, the narrow pulses which in the properly aligned video wave form 75 coincide with such scanning positions are offset therefrom, as shown in the wave form 75m. The extent of such video wave form offset will depend upon the magnitude of the misalignment. As a result of the characteristics of the wave form 75m, the output signal 77m of the sample-and-hold-gate 70 is shifted in a negative direction with respect to the zero DC voltage axis, wherefore the value of such signal 77m integrated over any number of whole or complete cycles has a negative average value. In an analagous manner the wave form of the output signal 78m from the sample-and-hold-gate 71 is shifted in a positive direction with respect to the zero voltage axis, wherefore the value of such signal 77m integrated over any number of whole cycles has a positive average value.

The resultant signals then appearing on the signal lines 41 and 42 are amplified by the servo amplifiers 36 and 37, and the outputs thereof are used to energize the motors 28 and 29 in directions tending to align the two patterns which, in the case of the specific example being considered, will result in the pattern 46 and component 22 carrying the same being shifted in positive directions along the x and y axes. It should be understood that any misalignment of the pattern 46 will cause DC signals to be developed on one or the other or both of the signal lines 41 and 42, as the case may be, and the polarity and magnitude of any such signal is indicative of the direction and extent of the misalignment in the x and y directions.

The discriminator 43 is illustrated in block diagram form in FIGURE 4 and is shown there to include a low-pass filter 79 which receives as its input the video signal appearing on the line 63. The output signals from the low-pass filter 79 are transmitted by a signal line 80 to a limiter 81, the output of which is delivered by signal line 82 to a pair of multipliers 83 and 84. Each of the multipliers 83 and 84 has an additional signal input thereto, and in the case of the multiplier 83, such signal is the F reference signal appearing on the line 49 after being delayed in a time-delay network 85 coupled to the multiplier 83 by a signal line 86. In the case of the multiplier 84, such additional signal is the "F—90°" reference signal appearing on the line 50 after being delayed in a time-delay network 87 coupled to the multiplier 84 by a signal line 88. The output signal from the multiplier 83 is delivered to the signal line 44 for transmission thereby to the aforementioned servo amplifier 38 and, correspondingly, the output signal from the multiplier 84 is delivered to signal line 45 for transmission thereby to the aforementioned servo amplifier 39.

The function of the discriminator 43 and component parts thereof is most readily explained with reference to the wave forms of the signals appearing at various locations in the discriminator, and such wave forms are illustrated in FIGURE 5 to which reference will now be made. As in the case of the wave forms associated with the discriminator 40, as depicted in FIGURE 3, the zero axes of the wave forms are identified for convenience by the signal lines on which the wave forms appear. The uppermost wave form 89 is a square wave and constitutes the F signal from the time-base generator appearing on the line 49. The next successive wave form is denoted with the numeral 90 and is a square wave constituting the "F—90°" signal from the time-base generator appearing on the line 50. Each of the wave forms 89 and 90 is symmetrical and has positive and negative cycles spanning 180° in each instance; and the wave form 90, as explained hereinbefore, lags the wave form 89 by 90°. The F reference signal appearing on the line 86 after being delayed in the time-delay network 85 is depicted in FIGURE 5 as the wave form 91, and the "F—90°" reference signal appearing on the line 88 after being delayed in the time-delay network 87 constitutes the wave form 92.

Considering first a condition in which the patterns 46 and 47 are properly aligned, the video wave form then appearing on the line 63, shown in FIGURE 5 just below the wave form 92, represents such condition of alignment and is, therefore, the same wave form illustrated in FIGURE 3 and denoted there with the numeral 75. Accordingly, such wave form is again identified in FIGURE 5 with the same numeral. Corresponding to such condition of proper alignment, the signal output from the low-pass filter 79 appears on the signal line 80 and is illustrated in FIGURE 5 as the wave form 93; and the output signal resulting therefrom which appears on the line 82 from the limiter 81 in a square wave 94. The multiplier outputs respectively appearing on the signal lines 44 and 45 are each square waves having equal positive and negative portions so that the DC signal outputs on such lines are essentially zero in each instance, and these wave forms are respectively denoted in FIGURE 5 with the numerals 95 and 96.

To complete the identification of the wave forms illustrated in FIGURE 3, the five lowermost wave forms represent a condition in which the patterns 46 and 47 are misaligned, such as the condition of misalignment illustrated in FIGURE 5b. These five wave forms respectively constitute the video signal appearing on the line 63, the output signal appearing on the line 80 from the low-pass filter, the output signal appearing on the line 82 from the limiter 81, the output signal appearing on the line 44 from the multiplier 83, and the output signal appearing on the line 45 from the multiplier 84. For purposes of identification, these five wave forms are respectively denoted 75m, 93m, 94m, 95m and 96m. As respects the signal depicted by the wave form 95m, it has an average positive DC value, and the signal depicted by the wave form 96m has an average negative DC value.

Comparing the wave forms 75 and 93, it will be evident that the low-pass filter 79 removes from the input signal thereto the narrow pulses appearing at the 0°, 90°, 180° and 270° positions in the perfectly aligned video wave form 75. The limiter 81 processes the filtered wave form 93 to restore the sharp, square wave characteristics lost in passing the signal through the filter 79. Since the filter 79 introduces a delay in the video signal, corresponding delays must be introduced in the "F" and "F—90°" reference signals being transmitted to the multipliers 83 and 84 so that such reference signals will arrive in time coincidence with the filtered and shaped video signal transmitted to these multipliers.

The multipliers 83 and 84 can be either analog or digital multipliers, and in the particular system being considered, a digital multiplier in the form of an exclusive-or-gate multiplier is used. The output signal of such multiplier is positive when both of the input signals thereto have the same polarity or sign, and is negative when both of the input signals are of opposite polarity. Such operational characteristics of the multiplier 83 in producing output signals is evident from FIGURE 5 by comparing the wave forms 91 and 94 with the wave form 95 for in each instance that the wave forms 91 and 94 have the same polarity, the wave form 95 is positive and whenever the wave forms 91 and 94 are of opposite polarity, the wave form 95 is negative. A similar result is evident when the wave forms 92 and 94 are compared with the wave form 96.

Integrating the signal outputs respectively appearing on the lines 44 and 45 will demonstrate that the average DC voltage over one or more complete scanning cycles is substantially zero. More particularly and considering for example the multiplier 83, it will be observed by inspecting the wave form 89 that the polarity thereof is changing whenever the scanning spot moves between the left and righthand halves of the scanning pattern (i.e., crosses the vertical or y axis) which occurs at the 0° and 180° positions along the time axis of the wave form 89. At this time the multiplier 83 is comparing the quantity of the pattern 47 lying on each side of such vertical axis. If the two pattern quantities are not equal, then the pattern 47 is not symmetrically disposed with respect to the y or vertical axis. In an analogous manner, the multiplier 84 is responsive to the quantities of the pattern 47 lying on either side of the x or horizontal axis, and if the pattern 47 is not symmetrically disposed with respect to such axis, the resultant misalignment will be sensed by the multiplier 84.

A condition of misalignment is illustrated in FIGURE 5b, and in this figure the pattern 47 is offset in both the x and y directions with respect to the aforementioned Cartesian coordinate system having its origin at the center of the scanning pattern. As concerns such coordinate system, the center of the pattern 47 is offset in the +x, +y, direction and lies in the first quadrant of the system. The wave form of the video signal corresponding to such condition of misalignment of the pattern 47 is shown by the wave form 75m in FIGURE 5, and the output signal corresponding thereto from the low-pass filter 79 has the characteristics of the wave form 93m. The resultant output signal from the limiter 81 appearing on the line 82 is shown at 94m. Corresponding thereto, the output signals of the multipliers 83 and 84 respectively appearing on the lines 44 and 45 have the wave forms shown as 95m and 96m.

Since the pattern 47 is misaligned, the video signal appearing on the line 63 will not be symmetrical because the scanning spot will sense or find a greater concentration of pattern above the x axis than below such axis. Thus, comparing the video signal wave forms 75 and 75m, it will be observed that as concerns the wave form 75, it repeats each 90° time period while the wave form 75m is essentially non-repetitive throughout any complete scanning cycle. As a consequence of such non-repetitive wave form, the signal output 94m from the limiter 81 has a wave form that correspondingly varies during each 90° interval and, therefore, the voltage wave forms 95m and 96m do not have an essentially zero value when averaged over any complete scanning cycle. Rather, the average value of the DC voltage appearing on the line 44 is positive when averaged over any one or more complete cycles, and the DC voltage appearing on the line 45 has a negative value when similarly averaged. As explained hereinbefore, the signal voltages appearing on the lines 44 and 45 are correction signals delivered to the servo amplifiers 38 and 39, respectively, to energize the motors 32 and 33 as necessary to effect corrective displacements of the component 23 toward a condition in which the pattern 47 is positionally aligned with the pattern 46 as illustrated in FIGURE 5a.

To a considerable extent, many of the circuit networks employed in the alignment system are essentially conventional. However, as an aid to description, certain networks which may be considered typical for use herein will now be described.

First considering the position discriminator 40 shown in block diagram in FIGURE 2, each of the sample-and-hold-gates 70 and 71 thereof may comprise the circuitry illustrated in FIGURE 6. Referring to this figure, the circuit is seen to comprise a pair of transistors 97 and 98 connected emitter to emitter with the collector of the transistor 97 receiving the associated reference signal input as, for example, the x-deflection reference signal fed to the sample-and-hold-gate 70 on the signal line 54. The circuit output is taken from the collector of the transistor 98 and appears as a correction signal on the signal line 41 or 42, as the case may be. The bases of the transistors 97 and 98 are connected to each other through the secondary winding 99 of a coupling transformer 100, the primary winding 101 of which is grounded at one end and at its other end receives the "sample-command" signal on the input signal line 69 thereto from the inverted-and-gate 68. A resistance 102 forming a current path therefor is connected in parallel with the primary winding 99, and the output-signal line (41 or 42) on which the correction signal appears is grounded through a storage capacitance 103 functioning as a voltage integrator.

The transistors 97 and 98 in the circuit interconnection illustrated define a switch having two input signals applied thereto, one of which is the reference signal wave form appearing on the signal line 54 or 55, and the other of which is the sample-command signal wave form appearing on the line 69. Referring again to FIGURE 3, it is seen that the wave forms appearing on the signal lines 41 and 42 suddenly change from one value to another in accordance with the character of the sample-command signal fed thereto on the line 69. Further, and considering the case in which the video wave form 75 represents a condition of alignment between the patterns 46 and 47, the sample-and-hold-gate 70 produces an output wave form 77 that jumps from zero to a positive value at the 90° scanning position, and such positive value is then maintained until the scanning spot reaches the 180° position at which time the wave form returns immediately to a zero value. Such zero value is again maintained until the scanning spot reaches the 270° position at which point the deflection wave form appearing on the signal line 54 is again sampled and found to have a negative value, whereupon the wave form 77 suddenly assumes a negative value which is then maintained until the 360° position of the scanning spot is reached at which time the wave form 77 quickly returns to zero.

Evidently, the switch defined by the transistors 97 and 98 is closed whenever the sample-command signal appearing on the line 69 is positive, and the switch is open whenever the sample-command signal is negative. The switch controls charging of the capacitance 103 and permits it to be charged to the voltage value of the signal to be sampled (i.e., $x$ or $y$ deflection signal appearing on the line 54 or 55) whenever the switch is closed. The capacitance 103 is quickly charged during the sampling time afforded, and when the sample-command signal terminates, the capacitance effectively retains its charge since the rate of discharge thereof is quite low. Accordingly, the capacitance 103 integrates the various successive samplings over a complete scanning cycle to provide on the output signal line 41 or 42 a DC voltage value corresponding to the positional disposition of the pattern 46. Thus, if the pattern is properly positioned, the average DC voltage of the signal appearing on the line 41 or 42 is substantially zero; but if the pattern is not properly aligned, the average voltage of the signal will have either a positive or negative polarity indicative of the direction of the misalignment and a magnitude corresponding to the extent of the misalignment.

The inverted-and-gate 68 may comprise standard circuitry and, for example, a Signetics LU 315 nor-gate can be used for the gate 68.

Considering the position discriminator 43, the low-pass filter 79 thereof may be taken from the text entitled "Simplified Modern Filter Design" by Philip R. Geffe, published by Hayden Book Co., Inc., 1966, pages 1 through 18. The limiter 81 may be a limiting amplifier such as disclosed in Hobrough application, Ser. No. 394,502, filed Sept. 4, 1964 (see in particular FIGURE 11 and the descriptive material referenced thereto). Similarly, the time-delay networks 85 and 86 may be lumped constant delay lines of the type disclosed in such Hobrough application, Ser. No. 394,502 (see in particular FIGURE 27 and the descriptive material referenced thereto). The multipliers 83 and 84 are digital multipliers, as explained heretofore, and they may be exclusive-or-gates of the type disclosed in the aforementioned application, Ser. No. 394,502 (see in particular FIGURES 22 and 23 and the descriptive material referenced thereto).

Turning to the time-base generator 48, a block diagram thereof is illustrated in FIGURE 7, and such generator is seen to comprise an oscillator 104 which may be of the type disclosed in Adler application, Ser. No. 564,917, filed July 13, 1966 (see in particular FIGURE 4 and the descriptive material referenced thereto), in which case the oscillator is self-excited. The signal output from the oscillator constitutes a chain of square wave pulses delivered by a signal line 105 to a frequency divider 106 that divides the signal frequency by two. The divider 106 provides two output signals one of which is fed by a signal line 107 to a frequency divider 108 that divides the frequency of the input signal by two and delivers on its output signal line 51 the aforementioned "$4F-90°$" signal constituting one of the inputs to the position discriminator 40.

The other output signal from the frequency divider 106 is delivered via a signal line 109 to another divide-by-two frequency divider 110 connected by a signal line 111 to a further divide-by-two component 112. The signal line 111 is also connected to the aforementioned frequency divider 108 and provides a synchronization input signal thereto to time the "$4F-90°$" signal with the F (and $F-90°$) signals. The frequency divider 112 has two outputs one of which travels by a signal line 113 to a frequency divider 114 which again divides the frequency in half and provides on its output signal line 49 the prior-described F signal constituting one of the inputs to the position discriminator 43 and the input to the deflection amplifier 52. The other output signal from the frequency divider 112 is delivered by signal line 115 to a frequency divider 116 which further divides the frequency in two and provides on its output signal line 50 the aforementioned "$F-90°$" signal constituting one of the inputs to the position discriminator 43 and the input to the deflection amplifier 53. Synchronization signals are delivered by a line 117 to the frequency divider 116 from the output signal line 49 of the frequency divider 114 so as to synchronize the "$F-90°$" signal with the F signal.

Each of the frequency dividers 106, 108, 110, 112, 114 and 116 may be a standard circuit component such as a J-K flip-flop as, for example, an integrated circuit component identified by the designation LU 320 and sold by the previously mentioned Signetics Corporation of Sunnyvale, Calif. In this instance, the signal lines 107 and 109 are respectively connected to the terminals 1 and 0 of the integrated circuit providing the frequency divider 106, and the signal lines 113 and 115 are respectively connected to the same terminals of the integrated circuit providing the frequency divider 112.

The functions performed by the oscillator and frequency divider components comprising the time-base generator 48 are readily apparent upon reference to the wave forms of the signals appearing at various points in such circuit, and such wave forms are illustrated in FIGURE 8 to which reference will now be made. As a matter of convenience in identification, the axes of the wave forms are labeled with the numerals used to designate the signal lines on which such wave forms appear, and each of these axes in FIGURE 8 is a zero-voltage line to which the wave forms are referenced. The uppermost wave form 118 constitutes a succession of square waves defining a pulse-type output signal from the oscillator 104 appearing on the line 105. The frequency of these square wave pulses is determined by the oscillator, and the pulse frequency is divided by two in the frequency divider 106 so that the signal wave form 119 appearing on the signal line 107 from this divider has the timing characteristics shown in FIGURE 8. This signal is further reduced in frequency by the frequency divider 108 so that the signal appearing on the output line 51 thereof is the previously discussed "$4F-90°$" signal having the wave form 74.

The second output signal from the frequency divider 106 appears on the line 109 and has the wave form 120 which, as shown in FIGURE 8, is at the same frequency as the wave form 119 but is reversed in polarity with respect thereto so that when the signal 119 is negative, the signal 120 is positive and vice versa. The frequency of the signal wave form 120 is divided by two in the frequency divider 110 with the result that the signal appearing on the line 11 has the time relationship defined by the wave form 121. This signal 121 is further reduced in frequency by a factor of two in the divider 112 so that the wave form 122 appearing on the signal line 113 has the appearance shown in FIGURE 8 relative to the wave form 121. Again, the frequency of the signal appearing on the line 113 is divided by two in the divider 114 and the output signal on the line 49 thereof is the aforementioned F signal and has the wave form 89. The second output signal from the divider 112 appears on the line 115 and the wave form 123 thereof has the same frequency as that of the wave form 122 but is reversed in polarity with respect thereto. The signal on the line 115 is divided in half in the divider 116, wherefore the signal appearing on the output line 50 thereof, has the wave form 90 and constitutes the aforementioned "$F-90°$" signal.

Considering now the deflection amplifiers 52 and 53, they are identical and are illustrated in FIGURE 9 which is a schematic circuit diagram of one of these two amplifiers and, for purposes of specificity, may be taken to be the amplifier associated with the $x$ scanning signal. Accordingly, the input signal thereto is taken from either the line 49 and is delivered to the first stage of the amplifier 52, which first stage thereof comprises a squaring circuit operative to accept the square-wave F input signals thereto and to limit the amplitude thereof as desired in order to reduce or eliminate any noise contained in such input signals.

The squaring circuit provides two output signals which are 180° out of phase, and these signals appear respectively on the collector elements of a pair of transistors 137 and 138. Such two output signals from the squaring circuit are respectively transmitted on conductors 139 and 140 through coupling capacitors 141 and 142 to the base elements of transistors 143a and 143b respectively comprised in separate tuned amplifier circuits arranged in a push-pull configuration and which provide on output signal lines 144a and 144b respectively associated therewith sine wave deflection signals which are 180° out of phase and are delivered to the opposite deflection plates forming the x scan deflection system of the flying spot cathode ray tube 56. The two tuned amplifiers are identical, and they provide output scanning signals which are 180° out of phase because the two input signals thereto have an opposite phase relationship. In that one of the tuned amplifiers is a duplicate of the other, the respectively corresponding elements of each are denoted with the same numeral but with the suffixes a and b used to differentiate therebetween.

Considering the amplifier associated with the input signal line 139 and coupling capacitor 141, the transistor 143a thereof has a grounded emitter, and the output signal therefrom is fed directly to the base of an output stage defined by a transistor 145a which has its emitter connected to the aforementioned output signal line 144a by a capacitor 146a. The collector elements of the transistors 143a and 145a are connected to the voltage supply by load resistances 147a and 148a, and the emitter of the transistor 145a is grounded through a resistance 149a. The base element of the transistor 143a is connected to a negative voltage supply by a biasing resistance 150a; and the base element further has connected thereto a pair of serially related resistances 151a and 152a which are arranged in parallel with a capacitance 153a and an LC circuit in series therewith formed by a shunt connected inductance 163a and capacitance 164a. An AC path to ground for such base element is provided by a capacitance 154a connected to the juncture of the resistances 151a and 152a.

The squaring circuit comprises, in addition to the transistors 137 and 138, current-limiting resistances 155 and 156 respectively connecting the collector elements of such transistors to the aforementioned low voltage supply, and it further comprises a plurality of serially connected voltage divider resistances 157 and 159 which provide a DC flow path between ground and a positive potential low voltage source. The base element of the transistor 138 is connected to the juncture of the resistances 157 and 159. The collector element of the transistor 160 is connected directly to the emitter elements of the two transistors 137 and 138, and the emitter of the transistor 160 is connected to such positive potential low voltage source through a fixed current-limiting resistance 161 and a potentiometer 162.

The base of the transistor 160 is connected to a zoom control circuit 65 operative to reduce the scanning raster of the cathode ray tube 56 and thereby magnify or "zoom in" on a restricted area of the alignment patterns 46 and 47. As indicated in FIGURE 9, the zoom control circuit 65 is also connected to the y deflection amplifier 53.

Adjustment of the potentiometer 162 varies the magnitude of the current flowing in the emitter circuit of the transistor 160 and thereby provides a means for selectively adjusting the size of the scanning raster along the x axis of the cathode ray tube 56. Since the deflection amplifier 53 constitutes a duplicate of the amplifier 52, it will be apparent that an adjustment means is provided for selectively varying the size of the scanning raster along the y axis of the cathode ray tube 56.

Evidently, the deflection amplifiers 52 and 53 accept the square-wave output signals from the time-base generator 48, limit such signals to reduce the noise level thereof, and provide amplified sine waves defining the deflection signals for energizing the scanning raster of the cathode ray tube 56. Two separate scanning signals for each raster axis are provided by amplifiers 52 and 53, as noted heretofore, and the two signals from each amplifier are out of phase by 180°. With the particular cathode ray tube utilized in the system being considered in detail, the use of two scanning signals in phase opposition for each raster axis prevents deflection-caused defocusing and permits smaller-amplitude scanning signals to be used than would be the case if but one sweep signal were provided for each deflection axis.

Further considering the zoom control circuit 65, the function thereof is to adjust automatically the size of the raster of the flying spot scanner tube 56 in a continuous progression approximately corresponding to the diminishing magnitudes of the correction signals (without sensing the same or being responsive thereto), which diminishing magnitudes are the result of the alignment patterns and components 22 and 23 providing the same being relatively displaced toward the desired condition of alignment following initial acquisition by the scanning system. In its operation, the zoom control circuit produces an output voltage ramp that slowly and progressively changes between set limits the scanning area from an initially large acquisition area to a finally small alignment area. The slope or rate of change of the voltage ramp is preadjusted, as by manual control provided therefor, so as not to exceed the response time of the servo motors 28, 29, 32 and 33. For details of a particular zoom control circuit that may be used, reference may be made to the aforementioned Adler application, Ser. No. 564,917 (see in particular FIGURE 10 and the descriptive material referenced thereto).

A suitable amplifier circuit which may be used for the video amplifier 62 is shown in detail in such Adler application, Ser. No. 564,917, and FIGURE 7 thereof and the descriptive material references thereto may be considered in particular. A typical cathode ray tube for use as the flying spot scanner 56 is a NU142P16 (National Union), and a typical multiplier phototube is a XP1110 (Amperex).

Modified alignment system

The modified embodiment of the invention illustrated in FIGURE 10 departs from the embodiment heretofore described, which is generally shown in FIGURE 1, in the following primary respects. First, the modified alignment system is operative with components that are not both transparent; wherefore, the scanning beam cannot pass therethrough and some means must be provided in the system for utilizing at least a fraction of the scanning light reflected from the non-transparent component. Second, the alignment system shown in FIGURE 1 does not include provision for correcting rotational misalignment as between the two patterns 46 and 47 and the components 22 and 23 respectively provided therewith. That is to say, the system of FIGURE 1 is operative to displace the components 22 and 23 relative to each other along the aforementioned x and y axes but cannot rotate the components relative to each other to correct any angular misalignment therebetween. The modified system illustrated in FIGURE 10 does accommodate rotational misalignment and includes means for automatically correcting the same. Third, in the particular alignment systems being described in which two components respectively provided with alignment patterns are involved, there are three factors to be considered in effecting a condition of alignment between the patterns and components providing the same. More particularly, such factors constitute each of the two pattern-equipped components and the scanning beam from the flying spot scanner associated therewith. Evidently, these factors constitute possible variable, and so long as any two of the variables are adjustable, the third may be fixed.

In the system shown in FIGURE 1, the scanning beam of the flying spot scanner 56 is fixedly located in the sense that it traverses a circular path about a center that is fixed in space. Each of the components 22 and 23 is movable relative to such scanning beam and the fixed center thereof (along the $x$ and $y$ axes, but not in a rotational sense) to enable the patterns 46 and 47 to be brought into a condition of alignment with each other relative to the center of the scanning pattern. In many instances it is more convenient to move the center of the scanning pattern rather than each of the pattern-equipped components because the center of the scanning pattern can be adjusted by changing the potentials in the scanning system, whereas movement of such components requires physical or mechanical displacements. The modified systems shown in FIGURE 10 effects alignment between the patterns relative to the center of the scanning pattern associated therewith by relatively moving one of the components and the center of the scanning pattern.

Such modified scanning system is particularly suited for use in the fabrication of integrated circuits and other semiconductors, and turning now to a detailed consideration of the modified system, it is seen to include an opaque or other light-reflective component 22' which may be a silicon wafer upon which an integrated circuit is to be constructed by photographic techniques. The component 22' is supported in a fixed location, and positioned thereabove is an alignment mask defining a transparent pattern-equipped component 23' by movable frame structure including a rack 26ab and a pair of racks 27a and 27b. The frame structure is displaceable along the $x$ axis by a servo motor 32ab which is under the control of a servo amplifier 38ab; and it is displaceable along the $y$ axis by servo motors 33a and 33b respectively under the control of servo amplifiers 39a and 39b.

The various racks are drivingly connected with the remainder of the frame structure as by means of ball and socket joints or the slot and tongue connections illustrated so as to permit relative displacements of the two racks 27a and 27b along the $y$ axis, which relative or differential displacements of the racks imparts rotational motion or angular displacements to the transparent component 23'. The support arrangement described for the transparent alignment mask, or component 23', and for the silicon wafer, or component 22', differs from the support arrangement illustrated in FIGURE 1 in the sense that only the mask 23' is displaceable along the $x$ and $y$ axes, whereas in the system of FIGURE 1, each of the pattern-equipped components was so displaceable and in the further sense that angular or rotational displacements can be imparted to one of the components so as to correct angular misalignment.

As concerns the capability of the modified system to align pattern-equipped components that are not both transparent, the scanning beam emanating from the flying spot scanner will be reflected by the non-transparent or opaque component and the reflected light, which is image modulated, is focused onto a photosensitive device to energize the same. In order that the reflected light images onto the photosensitive device have a high degree of fidelity, a beam splitter is used to change the direction of the light, and such beam splitter is interposed in the path of the light transmitted from the flying spot scanner to the components 22' and 23'. The beam splitter is disposed at an angle of 45° which results in the reflected light being redirected to the multiplier phototube at substantially right angles with respect thereto.

Prior to identifying the elements of the scanning composition specifically, it may be observed that the alignment system of FIGURE 10 is essentially symmetrical about a vertical plane extending through the center of the components 22' and 23' and between the two flying spot scanners 56a and 56b. In this sense, then, the right and left halves of the system are essentially duplicates of each other, and the reason for such duplication is that two separate sets of alignment patterns are provided by the components 22' and 23', and it is through such two sets of patterns that correction of any rotational misalignment as between the two components is effected. It may also be observed that the various elements of the system shown in FIGURE 10 are substantially the same as various elements comprised by the system shown in FIGURE 1, and for convenience in correlating the two systems, the same numerals are used to designate respectively corresponding elements except that certain of the numerals are primed and others have the suffixes $a$ and $b$ added thereto so as to differentiate between the two systems and between the left and right halves of the system of FIGURE 10.

The beam splitters respectively associated with the flying spot scanners 56a and 56b are noted with the numerals 165a and 165b, and they are interposed between the associated objective lenses 58a and 58b and the component 23'. The beam splitters may be completely conventional half silvered mirrors for example, and they function to pass therethrough about one half of the scanning light transmitted thereto from the associated flying spot scanners. That portion of the light which does not pass through the beam splitter in its travel toward the components 22' and 23' is directed through the collector lenses 59a and 59b to the respectively associated multiplier phototubes 60a and 60b aligned therewith and generally illuminates the same. Essentially this same division of light occurs with respect to the light reflected from the components 22' and 23' to the beam splitters with about one half of the reflected light being imaged onto the photosensitive cathodes of the multiplier phototubes 60a and 60b in each case.

The described arrangement is generally applicable to any case in which the pattern-equipped components are not both transparent, and it can be substituted into the system illustrated in FIGURE 1 as, for example, by locating the condenser lens 59 and multiplier phototube 60 on the same side of the component 22 as the flying spot scanner 56 but oriented at right angles with respect to the principal light ray emanating from the scanner tube. The beam splitter would be interposed between the component 22 and objective lens 58 so as to redirect a portion of the light reflected by a non-transparent component 23 onto the photosensitive cathode of the multiplier phototube 60.

In the particular alignment system illustrated in FIGURE 10, rotational alignment is effected by providing two separate sets of alignment patterns respectively denoted in the drawings as 46a, 47a, and 46b, 47b, and by providing what effectively constitutes two alignment systems respectively associated with such separate pairs of alignment patterns. Accordingly, the "F" and "F—90°" signals from the time-base generator 48 are transmitted via lines 49 and 50 to the two fan-position discriminators 43a and 43b and to the deflection amplifiers 52a, 52b, and 53a, 53b. The "4F—90°" signal is transmitted via line 51 from the time-base generator 48 to each of the cross-position discriminators 40a and 40b. The other two input signals to each of the cross-position discriminators 40a and 40b constitute, in the case of the position discriminator 40a, the scanning signals from the two deflection amplifiers 52a and 53a and, in the case of the position discriminator 40b, the scanning signals from the two deflection amplifiers 52b and 53b. The video output signals from the video amplifier 62a are delivered to each of the position discriminators 40a and 43a and, similarly, the video output signals from the video amplifier 62b are delivered to each of the position discriminators 40b and 43b.

It will be observed that the two output correction signals from the cross-position discriminator 40a are added to the output signals from the deflection amplifiers 52a and 53a are therefore delivered to the deflection system of the flying spot scanner 56a. Such correction signals from the position discriminator 40a constitute DC biasing voltages that determine the location of the center of the scanning pattern of the tube 56a, wherefore the center of such pattern can be shifted by changing the value of such biasing voltages. The location of the center of the scanning pattern of the flying spot scanner tube 56b is similarly determined by the DC biasing voltages delivered to the deflection system thereof from the position discriminator 40b. Accordingly, and whereas in the alignment system illustrated in FIGURE 1 the center of the scanning pattern remained fixed and adjustable displacements were imparted to each of the components 22 and 23 to obtain the requisite condition of alignment among the tripartite factors comprising the scanning pattern and each of the two pattern-equipped components, in the system shown in FIGURE 10 the component 22' is fixed and alignment among such tripartite factors is effected by adjusting the location of the center of the scanning pattern of the flying spot scanners 56a and 56b and by adjusting the position of the component 23'.

In this respect, one of the output signals from the fan-position discriminator 43a is transmitted to the servo amplifier 39a which, through a motor 33a associated therewith, is operative to displace one end of the component 23' along the y axis so as to move the alignment pattern 47a relative to the underlying pattern 46a and also relative to the center of the scanning pattern of the flying spot scanner 56a. In an identical manner, one of the output signals from the fan-position discriminator 43b is effective through the servo amplifier 39b and motor 33b to displace the opposite end of the component 23' along the y axis so as to effect a condition of alignment of the pattern 47b with the underlying pattern 46b and with the center of the scanning pattern of the flying spot scanner 56b. Evidently, differential displacements of the component 23' along the opposite end portions thereof by the motors 33a and 33b cause such component to rotate or be angularly displaced relative to the component 22'. It will be appreciated that the racks 27a and 27b are connected with the component 23' (or with the frame structure therefor, as heretofore explained) so that limited articulation accommodating such angular displacement is provided therebetween. The requisite articulation is quite restricted since the size of each component is relatively small and in the case of an integrated circuit wafer, is of the order of two square inches.

The second output signal from the position discriminator 43a and the second output signal from the position discriminator 43b are summed and delivered to the servo amplifier 38ab which, through a motor 32ab, is operative to adjustably displace the pattern-equipped component 23' along the x axis because of its connection with the racks 26ab. Thus, each of the position discriminators 43a and 43b contributes to adjustment of the component 23' along the x axis, and such an arrangement affords adequate corrective adjustment because the two patterns 47a and 47b are aligned along the x axis as are the two patterns 46a and 46b. The rack 26ab, as heretofore explained, is connected with the component 23' so as to permit the aforementioned very small angular displacements thereof enforced thereon by differential movements of the racks 27a and 27b.

The zoom control circuit 65 delivers its output signals to the two pairs of deflection amplifiers 52a, 53a, and 52b, 53b, so that the size of each of the scanning rasters on the respectively associated flying spot scanners 56a and 56b is controlled thereby. The video amplifier 62b delivers its output signals to each of the position discriminators 40b and 43b, which discriminators develop correction signals representing misalignment involving the alignment patterns 47b and 46b.

Operation of the system illustrated in FIGURE 10 is essentially the same as that of the alignment system shown in FIGURE 1 and heretofore described except for the specific differences already noted. Thus, the time-base generator 48, zoom control circuit 65, and various deflection amplifiers 52a, 53a, and 52b, 53b, function to provide input signals to the position discriminators and flying spot scanners, and the photosensitive devices 60a and 60b receive the reflected light directed thereto by the beam splitters 165a and 165b to deliver video signals to the respectively associated video amplifiers 62a and 62b which transmit their outputs to the associated position discriminators. The correction signals developed by the cross-position discriminators 40a and 40b are delivered to the associated flying spot scanners 56a and 56b to correctively shift the center of the scanning patterns defined thereby toward a condition of proper alignment. The correction signals from the fan-position discriminators 43a and 43b are delivered to the associated servo amplifiers 39a, 39b and 38ab to correctively displace the component 23' along the x and y axes thereof toward a condition of proper alignment. As noted, differential displacements of the opposite end portions of the component 23' along the y axis are effective to rotate the component 23' as necessary toward the desired condition of angular alignment.

As noted heretofore, much less mechanical equipment is required to adjustably displace the center of the scanning patterns of the flying spot scanners 56a and 56b than is required to displace the component 22', so that in this sense the system shown in FIGURE 10 would be somewhat less expensive than a comparable system in which the two components are displaced. However, the system of FIGURE 10 is somewhat more limited in its alignment capability than a system in which the two components are moved and the center of the scanning pattern remains fixed because if the orbital center of the alignment patterns are not maintained in an approximately centered relation with the centers of the two alignment patterns 46a and 47b, automatic control over the alignment operation may be lost when the zoom control circuit 65 reduces the diameter of the scanning pattern in zooming in on the alignment patterns.

Figure 11:
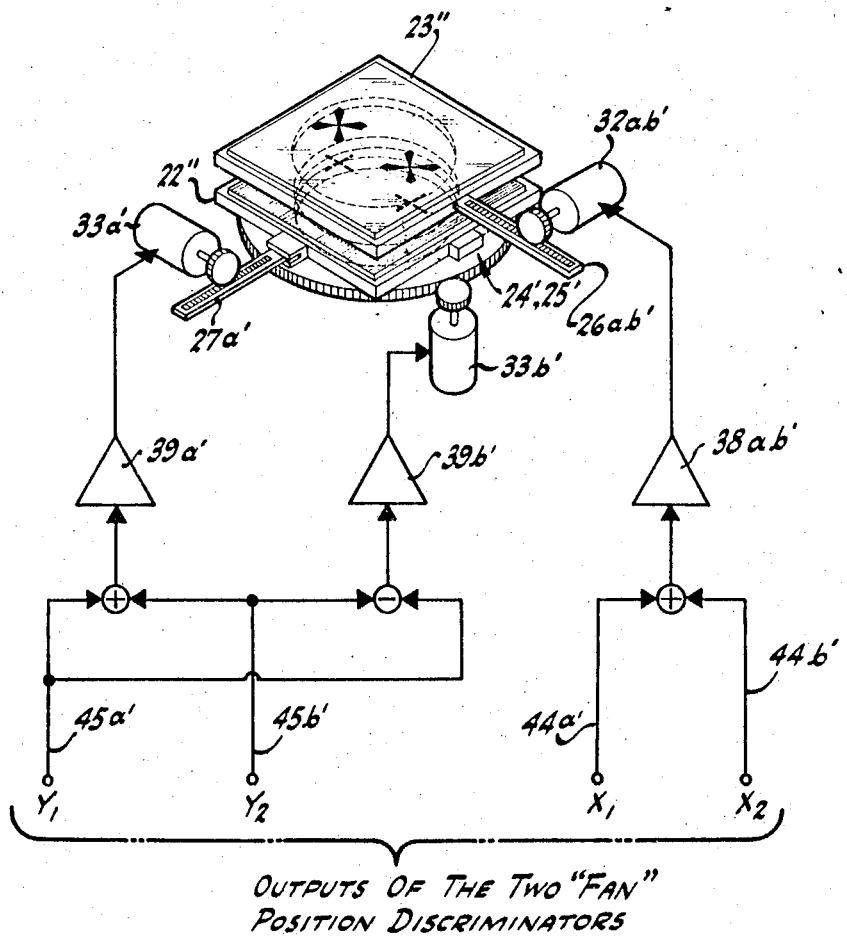
FIGURE 11 is a diagrammatic view of a further modification directed to a system of the type shown in FIGURE 10.

A further modified system is illustrated in FIGURE 11 but it departs from the system of FIGURE 10 only in rather minor respects and particularly in the manner in which adjustments are effected along the y axis and the manner in which angular adjustments are accommodated. Accordingly, only a part of the entire system is illustrated in FIGURE 11 and for convenience of correspondence, the primed form of the same numerals are used to designate respectively corresponding components.

As respects the system illustrated in FIGURE 11, the time-base generator, zoom control circuit, various deflection amplifiers, position discriminators, and scanning system comprising the flying spot scanners, photosensitive devices, and video amplifiers may be the same as shown in FIGURE 10 except as concerns delivery of the output signals from the two fan-position discriminators 43a and 43b. Thus, the centers of the scanning patterns of the two flying spot scanners are adjusted automatically and as necessary toward a condition of alignment involving the tripartite alignment characteristics heretofore noted. However, as respects linear displacements of the pattern-equipped components along the x and y axes and angular displacements thereof, the changes between the systems respectively illustrated in FIGURES 10 and 11 are evident from inspection thereof.

More particularly in this respect, the x correction signals appearing on the lines 44a' and 44b' from the two fan-position discriminators (43a and 43b in FIGURE 10) are arithmetically added and delivered to the servo amplifier 38ab' controlling the motor 32ab' which imparts displacements along the x axis to the component 23" through the rack 26ab'. Thus, x axis displacements are effected in the same manner as in the system of FIGURE 10.

As concerns displacements along the y axis, they are imparted to the component 22″ (rather than to the cross-equipped component, 23′ in the case of the system of FIGURE 10) through a rack 27a′ connected with the component 22″ so as to permit relative angular motion therebetween. The motor 33a′ associated with the rack 27a′ is controlled by a servo amplifier 39a′ which receives as an input thereto the arithmetically summed y correction signals from the two cross-position discriminators (43a and 43b in FIGURE 10). The arithmetic difference between these same two y correction signals appearing on the lines 45a′ and 45b′ is delivered to a servo amplifier 39b′ which, through a motor 33b′, imparts rotational displacements to a platform or holder 24′, 25, through a gear sector positioned along the perimetric surface thereof, which gear may be a ring gear in the case of the platform being cylindrical. The holder 24′, 25′ supports the component 22″ thereon so that angular displacements are imparted thereto by any angular displacements of such holder. The system shown in FIGURE 11 otherwise functions in accordance with the system of FIGURE 10, as heretofore explained.

The mechanical vehicle illustrated in FIGURE 11 for shifting the cross-equipped component 23″ relative to the fan-equipped component 22″, all with respect to the centers of the scanning patterns, constitutes a substantially conventional x, y, θ stage comprised of parts or elements such as those sold commercially by the A. E. Leitz Co. or by the Nikon Co. Accordingly, the components 22″ and 23″ are frame or support structures having large central openings therethrough and respectively support thereon the cross-equipped silicon chip and the fan-equipped alignment mask. Similarly, the holder 24′, 25′ has a large central opening therethrough and, therefore, the entire mechanical stage can accommodate either of the scanning systems shown in FIGURES 1 and 10.

General observations

In each of the alignment systems considered, the scanning pattern described by the beam of the flying spot scanner is circular and also completely symmetrical since each half of the pattern, as bisected by the x axis, and each half of the pattern, as bisected by the y axis, is traversed in opposite directions by the scanning beam. Such symmetry cancels out errors which might otherwise result from poor optical resolution in the scanning system and from time delays in the multiplier phototubes, in the video amplifier circuitry, and in the position discriminator circuitry. Also, the same circular scanning pattern can be and is used for both coarse and fine alignment of the patterns, thereby obviating complexity that otherwise might be required.

The alignment patterns 46 and 47 are each symmetrical in the sense that the radials thereof are spaced from each other by equal angular distances. However, the patterns might be otherwise constructed as long as at least one of the patterns has two symmetrical areas enabling centering to be effected by cancelling half areas thereof. Also while it is convenient to treat with patterns which are dissimilar, as in the case of the patterns 46 and 47, identical patterns might be provided depending upon the orientation thereof. For example, identical patterns each having four equally spaced radials might be employed if the radials of the two patterns are offset from each other by about 45°, and should such identical patterns have three equally spaced radials, the radials of the two patterns should be offset by about 60°.

The scanning systems heretofore considered in detail use flying spot scanners and sensors such as multiplier photo-tubes, but it will be appreciated that there are many other types of scanning systems which can be used quite successfully. Generally, scanning systems include both mechanical arrangements such as a disc scanner in which the entire component area to be inspected is illuminated and point-by-point inspection thereof is effected by means of an aperture-equipped plate or disc which is rotated so that only the very restricted area of the component aligned at any instant with the aperture in such disc is inspected; and various electronic arrangements such as those using an image dissector tube, an iconoscope, a vidicon, and an image orthicon, as well as the flying spot scanning system heretofore considered. For a treatment of alternate scanning systems that might be employed, reference may be made to Chapters 7 and 8 in particular of a publication entitled "Television," 2nd edition, 1954, authored by Zworkin and Morton and published by John Wiley & Sons, Inc.

Concerning the cross-position discriminator, quite evidently the inverted-and-gate 68 shown in FIGURE 2 is readily replaceable with an and-gate if signal inverting means are provided elsewhere in the circuitry, which is readily accomplished. In a corresponding sense, the limiter 81 used in the fan-position discriminator 43 as illustrated in FIGURE 4 could be omitted, especially if the multipliers 83 and 84 are designed for nonlimited video input signals thereto, since the limiter simply sharpens the video input signals to the multipliers. In an analogous manner, the low-pass filter 79 might be omitted in certain circuit designs since the critical function performed by the circuit shown in FIGURE 4 is that of multiplying the video input signals against the "F" and "F—90°" reference signals to produce the DC correction signal outputs appearing on the lines 44 and 45.

For purposes of presenting a specific example of component values in typically illustrative circuits, the following may be considered:

The sample-and-hold-gate illustrated in FIGURE 6

| | |
|---|---|
| Transistor 97 | 2N2222. |
| Transistor 98 | 2N2222. |
| Transformer 100 | United Transformer Company PIP–12 pulse transformer. |
| Resistance 102 | 10K ohms. |
| Capacitance 103 | 1.0 microfarads. |

Time-base generator illustrated in FIGURE 7

An oscillator frequency of 6,400 cycles per second can be used, in which case the "F" reference signal would have a frequency of 400 cycles per second. Each of the frequency dividers may be LU320 integrated circuit components, as described hereinbefore.

Deflection amplifiers illustrated in FIGURE 9

| | |
|---|---|
| Transistor 137 | 2N3638A. |
| Transistor 138 | 2N3638A. |
| Capacitance 141 | 4.7 microfarads. |
| Capacitance 142 | 4.7 microfarads. |
| Transistors 143a and b | 2N3440. |
| Transistors 145a and b | 2N3440. |
| Capacitances 146a and b | 0.1 microfarad. |
| Resistances 147a and b | 150K ohms. |
| Resistances 148a and b | 2.7K ohms. |
| Resistances 149a and b | 39K ohms. |
| Resistances 150a and b | 82K ohms. |
| Resistances 151a and b | 300K ohms. |
| Resistances 152a and b | 100K ohms. |
| Capacitances 153a and b | 4.7 microfarads. |
| Capacitances 154a and b | 0.01 microfarad. |
| Resistance 155 | 10K ohms. |
| Resistance 156 | 10K ohms. |
| Resistance 157 | 9.1K ohms. |
| Resistance 158 | 3.9K ohms. |
| Resistance 159 | 2.0K ohms. |
| Transistor 160 | 2N3638A. |
| Resistance 161 | 8.2K ohms. |
| Potentiometer 162 | 50K ohms. |
| Inductances 163a and b | 15 millihenries. |
| Capacitances 164a and b | 0.1 microfarad. |

It should be appreciated that the specific circuit values set forth imply no criticality and can be varied greatly depending upon internal and external parameters, the choice of transistors, the specific function intended for the circuit in any environmental setting, etc.

While in the foregoing specification embodiments of the invention have been set forth in considerable detail for purposes of making a complete disclosure thereof, it will be apparent to those skilled in the art that numerous changes may be made in such details without departing from the spirit and principles of the invention.

What is claimed is:

1. A pair of components respectively comprising a work object and an alignment mask and being adapted to be located relative to each other in superposed juxtaposition and oriented in a predetermined condition of alignment, said mask being transparent and provided with a first alignment pattern and said work object being provided with a second alignment pattern, and each of said alignment patterns bearing a predetermined relation with respect to the component provided therewith and each pattern having a plurality of radials projecting outwardly from a common origin in angularly spaced relation, the radials of one of said patterns being distinguishable from the radials of the other such pattern so as to enable differentiation therebetween in utilizing said patterns to effect such condition of alignment of said components.

2. The components of claim 1 in which the radials in each of said alignment patterns are spaced from each other by substantially equal angular distances, the radials of one pattern being angularly displaced from the radials of the other whenever said components approximate such condition of alignment so that said radials are positionally distinguishable to enable such differentiation therebetween.

3. The components of claim 1 in which the radials of one of said patterns are dissimilar from the radials of the other such pattern in angular width so as to provide geometric differentiation therebetween.

4. The components of claim 1 in which the radials of one of said patterns progressively increase in angular width outwardly from the origin thereof.

5. The components of claim 1 in which the radials of each of said patterns are symmetrically disposed, the radials of one of said patterns being relatively narrow bars of substantially uniform angular width from origin to termini and the radials of the other of said patterns being generally fan-shaped and progressively increasing in angular width from origin to termini.

6. The components of claim 5 in which the radials of each of said patterns total four in number and are angularly spaced from each other by substantially 90°.

7. The components of claim 1 in which the radials in each of said alignment patterns total four in number and are angularly spaced from each other by about 90°, the radials of one pattern being angularly displaced from the radials of the other by about 45° whenever said components approximate such condition of alignment.

8. The components of claim 7 and further being provided with two spaced-apart sets of said alignment patterns.

9. In apparatus for effecting a predetermined condition of alignment between a pair of components respectively provided with alignment patterns distinguishable one from the other and each bearing a predetermined relation with the component provided therewith, a pair of support structures for respectively supporting said components, a scanning system including means for inspecting such alignment patterns to determine the relative positions thereof and for producing video output signals from which the relative positions of such alignment patterns can be ascertained, a pair of position discriminator units receiving such video output signals and for deriving therefrom correction signals indicative of any misalignment between such patterns relative to a reference position established in relation to said scanning system, a time-base generator connected with said scanning system and providing timing signals therefor and connected also with said discriminator units and selectively providing reference and timing signals utilized thereby in such derivation of correction signals, and alignment error correction means for effecting relative displacements of such alignment patterns and reference position in response to such correction signals to effect the aforesaid condition of predetermined alignment of said components.

10. The apparatus of claim 9 in which said alignment error correction means includes motor means connected with at least one of said support structures for selectively displacing the same along normally disposed $x$ and $y$ axes toward the aforesaid condition of predetermined alignment of said components.

11. The apparatus of claim 9 in which said alignment error correction means includes a plurality of motor means respectively connected with said support structures for selectively displacing the same along normally disposed $x$ and $y$ axes to effect the aforesaid condition of predetermined alignment of said components.

12. The apparatus of claim 9 in which said alignment error correction means includes means for changing the location of such reference position of said scanning system toward the aforesaid condition of predetermined alignment of said components.

13. The apparatus of claim 12 in which said scanning system includes an electron device having a scanning pattern of predetermined character described along a face thereof, and in which such reference position constitutes the approximate center of such pattern, said means for changing the location of such reference position including means for changing the biasing voltages applied to said electron device to change the center of the scanning pattern thereof.

14. The apparatus of claim 13 in which said electron device is a flying spot scanner and such scanning pattern is the raster thereof.

15. The apparatus of claim 9 in which said alignment error correction means includes motor means connected with at least one of said support structures for selectively displacing the same along normally disposed $x$ and $y$ axes toward the aforesaid condition of predetermined alignment of said components, and further includes means for changing the location of such reference position toward the aforesaid condition of predetermined alignment of said components.

16. The apparatus of claim 9 in which said scanning system produces a scanning pattern for inspecting such alignment patterns, and further comprising a scanning pattern size control circuit connected with said scanning system for reducing the size of the scanning pattern thereof from a relatively large acquisition area toward a smaller area about the centers of such alignment patterns so as to increase the accuracy of the alignment effected by the apparatus.

17. The apparatus of claim 9 in which said support structures maintain said components in superposed juxtaposition with such alignment patterns in superjacent relation, in which at least one of said components is sufficiently light transmitting to enable such patterns to be inspected concurrently by a single light-transmitting and light-receiving scanning system.

18. The apparatus of claim 9 in which said position discriminator units are provided with means for distinguishing between such patterns so as to be respectively associated therewith and produce correction signal outputs specifically pertaining thereto.

19. The apparatus of claim 18 in which said time-base generator produces $x$ and $y$ timing signals, and in which one of said discriminator units comprises a pair of sample-and-hold gates respectively receiving as inputs thereto the $x$ and $y$ timing signals produced by said time-base generator, and an and-gate receiving as its input the video output signals from said scanning system and a reference signal from said time-base generator and delivering its output signals to each of said sample-and-hold gates which are operative to produce certain of the aforesaid correction signals.

20. The apparatus of claim 18 in which the other of said position discriminator units comprises a pair of multiplier circuits respectively receiving as inputs thereto reference signals from said time-base generator, each of said multipliers further receiving as an input thereto the video output signals from said scanning system so as to produce from all of the input signals thereto certain of the aforesaid correction signals.

21. The apparatus of claim 9 in which said components are respectively provided with a pair of such alignment patterns disposed in spaced-apart relation with one of said components being sufficiently light transmitting to enable superjacent patterns to be scanned concurrently, said support structures respectively maintaining said components in superposed juxtaposition with the alignment patterns thereof being oriented in superjacent relation to define two spaced-apart sets thereof, said scanning system including a pair of scanner means respectively associated with such sets of alignment patterns for scanning the same concurrently, said apparatus further comprising a second pair of position discriminator units, one pair of said discriminator units being associated with one of said scanner means and the other pair of said discriminator units being associated with the other of said scanner means, and said alignment error correction means being effective to produce relative translational and rotational changes in response to such correction signals to effect the aforesaid condition of alignment of said components.

22. The apparatus of claim 21 in which said position discriminator units are provided with means for distinguishing between the two patterns in each set thereof so as to be respectively associated therewith and produce correction signal outputs specifically pertaining thereto, one position discriminator unit of each pair thereof being associated with the spaced-apart patterns provided by one of said components and the other position discriminator unit of each such pair being associated with the spaced-apart patterns provided by the other of said components, each of said position discriminator units providing two correction signal outputs respectively associated with normally disposed $x$ and $y$ axes along which at least certain of the aforesaid relative displacements are enforced toward the aforesaid condition of predetermined alignment of said components, said alignment error correction means including motor means connected with at least one of said support structures to displace the same angularly in response to the same-axis corrective signals from the two position discriminators associated with the same component.

23. The apparatus of claim 22 in which said motor means constitutes a motor connected with said one support structure so as to rotate the same, the same-axis correction signals to which said motor is responsive being arithmetically subtracted and delivered to said motor.

24. The apparatus of claim 22 in which said motor means constitutes a pair of motors connected with said one support structure at spaced-apart locations so as to differentially displace the same along one axis in response to the same-axis correction signals from the respectively associated position discriminators.

25. In an apparatus for effecting a predetermined condition of alignment between a pair of components respectively provided with alignment patterns each of which has a plurality of radials projecting outwardly from a common origin in angularly-spaced relation and being distinguishable one from the other and each bearing a predetermined relation with the component provided therewith, a pair of support structures for respectively supporting said components, a scanning system for inspecting such alignment patterns to determine the relative positions thereof and including means for producing a generally circular scanning pattern for inspecting such alignment patterns and further including means for producing video output signals from which the relative positions of such alignment patterns can be ascertained, a pair of position discriminator units receiving such video output signals and for deriving therefrom correction signals indicative of any misalignment between such alignment patterns relative to a reference position established in relation to said scanning system, a time-base generator connected with said scanning system and providing timing signals therefor and connected also with said discriminator units and selectively providing reference and timing signals utilized thereby in such derivation of correction signals, and alignment error correction means for effecting relative displacements of such alignment patterns and reference position in response to such correction signals to effect the aforesaid condition of predetermined alignment of said components.

26. The apparatus of claim 25 and further comprising a scanning pattern size control circuit connected with said scanning system for reducing the size of the circular scanning pattern thereof from a relatively large acquisition area toward a smaller area about the centers of such alignment patterns so as to increase the accuracy of the alignment effected by the apparatus.

References Cited

UNITED STATES PATENTS

| 3,031,135 | 4/1962 | Dimond et al. | 250—219 |
| 3,138,714 | 6/1964 | Heidenhain | 250—237 |
| 3,322,935 | 5/1967 | Wyke et al. | 250—219 |

RALPH G. NILSON, Primary Examiner

MARTIN ABRAMSON, Assistant Examiner

U.S. Cl. X.R.

250—217, 219